United States Patent Office 3,358,530
Patented Dec. 19, 1967

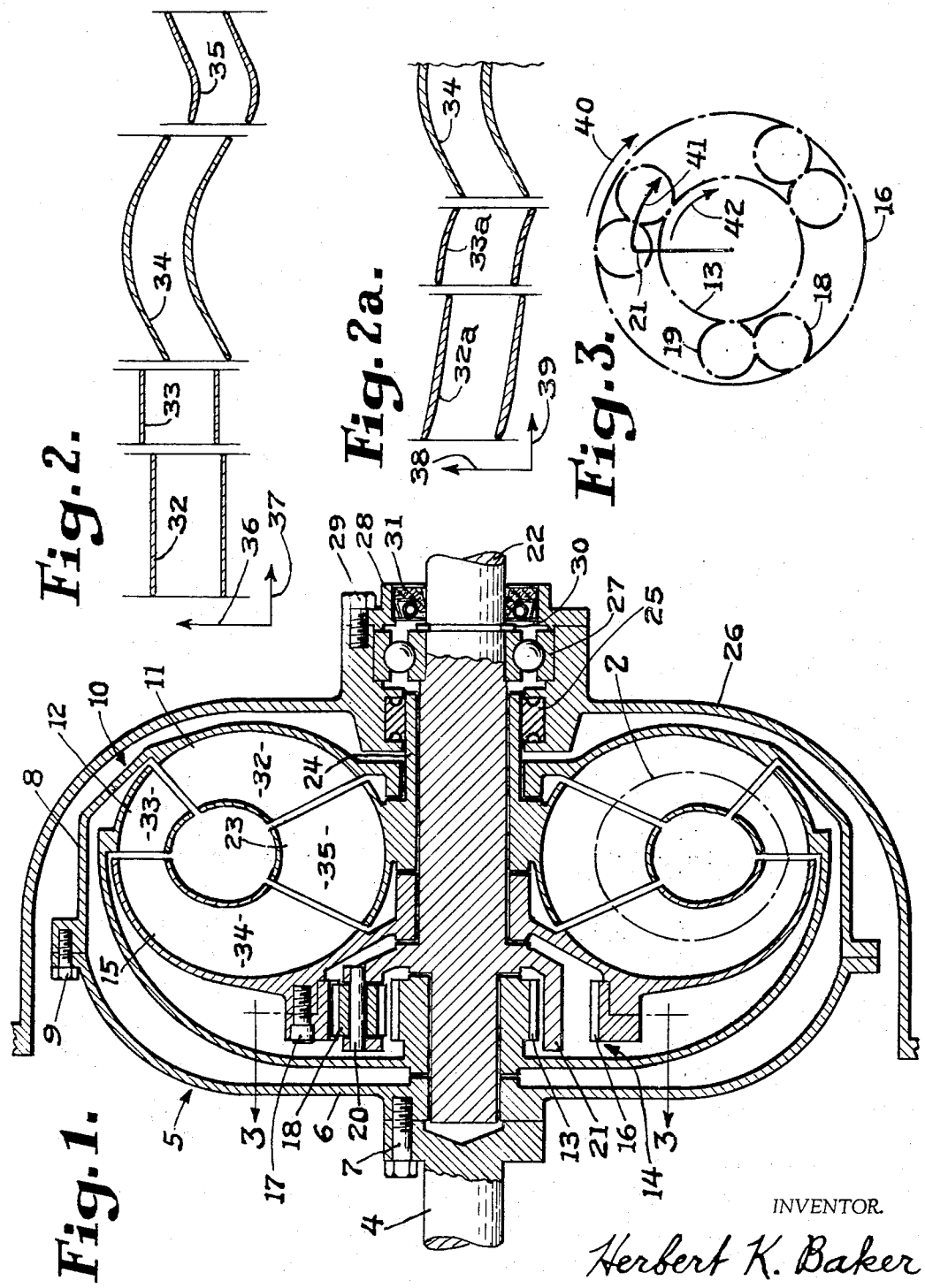

3,358,530
VARIABLE TORQUE MULTIPLYING DEVICES
Herbert K. Baker, Detroit, Mich.
(24481 Republic, Oak Park, Mich. 48237)
Filed Aug. 10, 1964, Ser. No. 388,638
19 Claims. (Cl. 74—677)

This invention relates to variable torque multiplying devices and in particular to those employing infinitely variable ratioing gearing of differential action character having regenerative reaction and arranged coactingly with hydrodynamic means similar to the kind disclosed in my copending application Ser. No. 858,640 filed Dec. 10, 1959, now Patent No. 3,150,542, and the present application is a continuation-in-part of this copending application.

In common with the forms of devices disclosed by my aforementioned copending application, the present invention discloses a turbine operatingly coupled to an element of a planetary gear set as the driving member thereof. This driving member transmits torque through planet pinions, in ratioed proportions, to two other elements of the gear set, one of which is arranged as a rotating gearing reaction member and the other as the output member. Under load stress, the rotating gearing reaction member tends to turn faster in the same direction than the driving member which turns at an intermediate speed and the output member at the lowest speed, comparatively, in an action of differential character.

The rotating gearing reaction member by its overrunning tendency initiates a regenerative circuit of mechanical and hydraulic action and of a magnitude corresponding to said reaction member ratioed proportion of the torque transmitted from the gear set driving member.

As in conventional practice, a prime mover drives the hydrodynamic means in what may be termed a power acting circuit, however, in my arrangement an enlarged hydraulic factor value is utilized, over that of conventional practice, to embrace both the power acting and the regenerative circuits.

Relative to increasing input speed, hydrodynamic means provide, as well known in the art, a more rapid rise of the power factor value than does mechanical transmitting means. The difference of values are inherent and that pertinent to the hydrodynamic means stems from the increment of fluid flow created by the differential of centrifugal heads between impeller and turbine elements which, obviously, mechanical means cannot provide.

In my arrangement, the aforementioned ratioed proportions of the turbine torque as transmitted by the driving member of the gear set, operating differentially, provides that ratioing to said output member is infinitely variable and has ever widening ratio compounding characteristics while that ratioed torque proportion transmitted to the rotating gearing reaction member has regenerative action. My regenerative circuit provides a self energizing hydraulic balance for the driving member and the rotating reaction member of the gear set, so that when the hydrodynamic means are properly fashioned and proportioned to absorb efficiently the loading factors imposed on these gearing members including the factor of turbine torque amplification, then, more nearly unimpaired compounding efficiency of the infinitely variable ratioing output of the gear set is attained.

An important object of the present invention is to enhance efficiency by arranging the impeller means for a two stage pumping action to separately absorb, by the first pumping stage the loading factors pertinent to the power acting circuit, by the second pumping stage the loading factors pertinent to the regenerative circuit.

Another important object of the present invention is provided by the two stage impeller rotor means wherein the first stage impeller rotor vanes can be fashioned, proportionately, for the match point of the hydraulic factor value to be at a lower input speed, relatively, than that of the second stage impeller rotor vanes which can be proportionately fashioned for the hydraulic factor value match point to be at a higher speed to, thus, provide more flexibility and sensitive accelerating response by the prime mover, at greater efficiency, since the match point occurs at higher speed in the regenerative circuit which is of a minor proportionate factor value.

Another important object of the present invention is to provide a means to efficiently absorb, hydraulically, that proportion of the variable turbine torque amplification factor as ratioed to the rotating gearing reaction member and transmitted thereby to the second stage impeller rotor which, relative to the speed of the first stage impeller rotor, imparts an overrunning action caused by this ratioed force exerted thereon and enlarges the hydraulic pumping load on this second stage impeller rotor while, correspondingly, increasing the torque loading capacity of absorption of said reaction gear member relative to the increased velocity thereof to, thus, absorb the turbine torque amplification factor as regeneratively ratioed and, the increased fluid flow velocity created is reconcilably absorbed by exercise of proper vane angularity determination.

Still another important object of the present invention is to provide acceleration means, activated from sharply increased fluid flow velocity initiated from the first stage impeller rotor by coupled coaction with the prime mover, to then act on the second stage impeller rotor vanes fashioned to lean back, relative to rotational direction, at an angular increase of fluid flow discharge, over that from the first stage impeller rotor vanes, to provide an overrunning action of the second stage impeller rotor and a degree of ratioing action between the input and output members of the gear set.

Advantages derived from my present invention include, a substantially less turbine torque amplification requirement because of the gear set extensive ratio compounding by differential action and a more moderate vane angularity reconciliation because of a narrowed operating differential ratio range between the turbine and the first stage impeller rotor, thus, enhacing overall efficiency and reduction of the heat rise factor of the hydrodynamic means.

The assembled foregoing described object increments of my present invention provide a transmission device having a variable torque multiplying action automatically responsive to the loading on the output shaft without supplementary control mechanism, the turbine rotor operates within a substantially narrowed differential ratio range of higher efficiency, the turbine torque amplification ratioing is, correspondingly, in turn extensively ratio compounded through the gear set, the two stage pumping action of the hydrodynamic means more efficiently absorbs and balance the gear loading factors imposed by the regenerative circuit with assistance from the overrunning action of the second stage impeller rotor vanes which when angularly fashioned to move this rotor ahead of the first stage impeller rotor upon sharp increase of fluid flow, acceleration is obtained without supplementary ratio "kickdown" mechanism of conventional practice and, therefore, providing a much simplified mechanism giving better performance.

Other objects and advantages will appear in the following specifications and in the accompanying drawings, in which:

FIGURE 1 is a longitudinal sectional view of the device including hydrodynamic means in coacting coupling with elements of a planetary gear set.

FIGURE 2 is a sectional view taken at 2 of FIG. 1 showing a vane contouring arrangement.

FIGURE 2a shows a modified contouring arrangement of the vanes from that shown in FIG. 2.

FIGURE 3 shows schematically the gear set sectional view taken at 3 to 3 of FIG. 1.

Referring to FIGURE 1, the device includes a power input member 4 drivingly connected to a prime mover (not shown), the hydrodynamic means 5 of which the frontal case portion 6 is bolted as at 7 to the power input member 4 to turn therewith, the rearward case portion 8 of the hydrodynamic means 5 is bolted as at 9 to the frontal case portion 6 to turn therewith.

The hydrodynamic means 5 includes a two stage impeller means 10 of which a first stage impeller rotor 11 is formed to turn with the hydrodynamic means rearward case portion 8 and, consequently, in driving connection with the prime mover, a second stage impeller rotor 12 drivingly coupled to the rotating gearing reaction member sun gear 13 of a planetary gear set 14.

A turbine 15 to which drivingly coupled thereto is ring gear 16 bolted as at 17 and this ring gear functioning as the driving member of gear set 14, intermeshed pinions 18 and 19 rotatably supported by shafts 20 which in turn are supported by pinion carrier 21 formed integral with an output shaft 22 to turn therewith.

Of the hydrodynamic means 5, a reaction member or rotor 23 is formed with a tubular shaft 24 to turn therewith, a one-way brake 25 operatingly surrounds the tubular shaft 24 and this brake 25 is supported by the stationary housing 26 so as to provide an action to prevent reverse rotation of reaction rotor 23 but, however, to free wheel forwardly in the direction of the turbine 15 rotation, the output shaft 22 is rotatably supported by ball bearing 27 which in turn is supported in a recess of stationary housing 26 and held to axial position by retainer 28 bolted as at 29 and on the output shaft 22 by snap ring 30, an oil seal 31 surrounds output shaft 22 and is pressed into a recess of retainer 28.

The vanes designated as 32 are of the first stage impeller rotor 11, vanes 33 are of the second stage impeller rotor 12, vanes 34 are of the turbine 15 and the vanes 35 are of the reaction rotor 23.

One form of vane contouring arrangement is shown in FIG. 2 wherein the first stage impeller rotor vanes 32 and the second stage impeller rotor vanes 33 are formed substantially flat extending radially and therefore depend on proportionment to achieve a predetermined match point reconciliation of hydraulic factor values with that of the mechanical means, however, the turbine vanes 34 and the reaction rotor vanes 35 are angularly contoured for turbine torque amplification and easement of fluid flow passing from one rotor to another, rotational direction of the rotors is indicated by the arrow 36 and the arrow 37 indicates the direction of fluid flow.

A modified arrangement from that of FIG. 2 is shown by FIG. 2a wherein the modified first stage impeller rotor vanes are indicated by 32a and the second stage impeller rotor vanes 33a and both are formed inclined to lean backward to the direction of their rotation for increasing fluid flow velocity, the vanes 33a at their fluid discharging ends may be formed to an angle greater than that of vanes 32a and, relative to proportioning provides flexibility for the overrunning feature of the second stage impeller 12, these vanes 33a as just described may also be utilized in arrangement with vanes 32 of FIG. 2 to provide a similar result, rotational direction of the rotors is indicated by the arrow 38 and the arrow 39 indicates the direction of fluid flow.

The gear set 14 is arranged as schematically shown in FIG. 3, the members of the gear set have been previously identified numerically, the arrow 40 indicates the rotational direction of the ring gear 16 as the driving member, arrow 41 the rotational direction of the pinion carrier 21 as the output member, arrow 42 the rotational direction of sun gear 13 as the rotating gearing reaction member, other planetary gear set arrangements may be utilized to provide a regenerative rotating gearing reaction member without departing from this invention.

Operational advantages of the present torque multiplying device will be better understood by first describing in detail the important functions of gear set 14, assuming that the power input member 4 is drivingly coupled to a prime mover such as an internal combustion carburetor engine, a diesel engine or an electric motor, etc.

A formula for calculating the progressive differential ratios between the members of gear set 14 are set forth following, first the symbols of the equation are, $G$ = Rotation of ring gear per rev. of sun gear
$A$ = Number of ring gear teeth
$B$ = Number of sun gear teeth
$R$ = Rotation of carrier output per rev. of sun gear
To find $R$ with $G$ known, $$\frac{(A \times G) - B}{A - B} = R$$

With the sun gear 13 having thirty-nine teeth and the ring gear sixty-nine teeth, progressive differential speed ratios of the members of gear set 14 are,

| Sun gear 2nd impeller | Ring gear turbine | Carrier output |
|---|---|---|
| 1.000 | .913 | .799 |
| 1.000 | .826 | .600 |
| 1.000 | .739 | .399 |
| 1.000 | .652 | .199 |
| 1.000 | .565 | .000 |

It will be noted that, at .000 stall ratio of the carrier output, the ring gear 16 coupled with the turbine 15 still rotates at a differential ratio of .565 relative to the 1.000 ratio of the sun gear, however, relative to the first stage impeller rotor 11 at a 1.000 ratio then the turbine speed differential therewith is narrowed and the second stage impeller rotor 12 overrunning with the sun gear 13 coupled to turn therewith.

At stall of the carrier output, the ring gear speed ratio being .565 at 1.000 ratio of the sun gear, therefore, .565÷1.000=.565 as the torque ratio of the sun gear 13, imposed thereon regeneratively, relative to the power acting circuit torque ratio being at a 1.000 value as imposed on the first stage impeller rotor 11, thus $$1.000 + .565 = 1.565$$

as the enlarged hydraulic torque ratio factor value embracing both the power acting and the regenerative circuits before the turbine torque amplification factor is calculated.

At carrier 21 output stall of .000 ratio, the turbine 15 speed ratio being .565 and assuming a moderate turbine torque amplification of 78 percent efficiency at this ratio, thus .78÷.565=1.380 as the amplified turbine torque ratio. The enlarged hydraulic torque ratio factor of 1.565×1.380=2.160 as the maximum amplified torque ratio loading on turbine 15 as transmitted to the ring gear 16 relative to the 1.000 torque ratio of the power acting circuit.

The rotating gearing reaction member sun gear 13 torque ratio being .565 and the combined power acting and regenerative circuits torque ratio being 1.565, relative to the power acting circuit ratio of 1.000, thus .565÷1.565=.361 as the torque ratio of the sun gear 13 relative to the 1.565 hydraulic torque ratio of the combined circuits. For including the maximum turbine torque amplification of the combined circuits as transmitted to the ring gear 16 and then regeneratively ratioed 2.160×.361=.780 as the maximum torque ratio of the sun gear 13 to include the overrunning speed factor effect thereon.

Referring to the overrunning speed factor effect, the hydraulic pump action as torque loading on the second stage impeller rotor 12 is increased, correspondingly, with increased overrunning speed, assuming a maximum overrunning ratio of 1.145 then $(1.145 \times .780) - .780 = .113$ as the increase of torque ratio loading thereby, however, transmitted torque ratio value decreases, correspondingly, with increase of speed by step-up or overrunning action, thus $.780 - (.780 \div 1.145) = .099$ as the decrease of torque ratio value thereby of the sun gear 13 coupled to the second stage impeller rotor 12, the increase and decreased factors combined $.113 + .099 = .212$ as increase of torque ratio absorption which must nearly balance the ratioed regenerative factor at the maximum turbine torque amplification phase minus that at the fluid clutching phase, thus respectively $.780 - .565 = .215$ ratio as the increase by turbine torque amplification which approximately balances the increase of torque ratio absorption, respectively $.215 - .212 = .003$.

Actually, the extent of the overrunning ratio of the second stage impeller rotor 12 is regulated by the vanes thereof being proportioned or contoured for reconciling the hydraulic factor values to that of the sun gear 13 at a predetermined match point.

The second stage impeller rotor 12 by its overrunning action exerts an increased velocity factor to the fluid flow which acts to substantially minimize the depressed dip in efficiency, customarily occurring with devices of conventonal practice, at the operational moment of moving out of the fluid clutching phase by the hydrodynamic means.

As disclosed from the foregoing, the two stage impeller means providing a separate pumping stage for the regenerative circuit more efficiently balances the reaction loading on the gear set members coupled to hydraulic rotor elements and attains nearly unimpaired efficiency advantage of the extensive ratio compounding action of the gear set in coaction with the hydrodynamic means.

The aforedescribed gearing arrangement with the hydrodynamic means utilizing two impeller rotors in cooperation with a turbine will also function in character with a fixed or stationary hydraulic reaction member.

Having thus described my invention, I claim:

1. A torque multiplying device including a power input member, a planetary gear set of infinitely variable speed ratioing action and hydrodynamic means in coupled arrangement therewith, the planetary gear set including a driving member, a rotating regenerative gearing reaction member and an output member arranged to be actuated by differential ratio action of the other two said gear set members, said planetary gear means including drive means between the driving member and the reaction member including means to transfer rotative movement from the driving member to the reaction member in the same relative direction whenever said output member is rotating at a different rotative speed than said driving member, the hydrodynamic means containing a motive fluid and including first stage and second stage impeller rotors, a turbine together with a hydraulic reaction member, first means connecting the first stage impeller rotor to the power input member and second means connecting the second stage impeller rotor to the rotating regenerative gearing reaction member to enable each of said impeller rotors to transmit torque to the motive fluid, means connecting the turbine to the gear set driving member to receive the combined torque from the motive fluid, the hydraulic reaction member being arranged to assist said turbine to amplify the torque there received.

2. A torque multiplying device including a power input member, a planetary gear set of infinitely variable speed ratioing action and hydrodynamic means in coupled arrangement therewith, the planetary gear set including a driving member, a rotating regenerative gearing reaction member and an output member arranged to be actuated by differential ratio action of the other two said gear set members, said planetary gear means including drive means between the driving member and the reaction member including means to transfer rotative movement from the driving member to the reaction member in the same relative direction whenever said output member is rotating at a different rotative speed than said driving member, the hydrodynamic means containing a motive fluid and including first stage and second stage impeller rotors, a turbine together with a hydraulic reaction member and a one-way brake, first means connecting the first stage impeller rotor to the power input member and second means connecting the second stage impeller rotor to the rotating regenerative gearing reaction member to enable each of said impeller rotors to transmit torque to the motive fluid, means connecting the turbine to the gear set driving member to receive the combined torque from the motive fluid, the hydraulic reaction member being arranged responsive to the one-way brake to assist said turbine to amplify the torque there received and for free wheeling action in the direction of turbine rotation.

3. A torque multiplying device including a power input member, a planetary gear set of infinitely variable speed ratioing action and hydrodynamic means in coupled arrangement therewith, the planetary gear set including a driving member, a rotating regenerative reaction sun gear member and an output member arranged to be actuated by differential ratio action of the other two said gear set members, said planetary gear means including drive means between the driving member and the reaction sun gear member including means to transfer rotative movement from the driving member to the reaction sun gear member in the same relative direction whenever said output member is rotating at a different rotative speed than said driving member, the hydrodynamic means containing a motive fluid and including first stage and second stage impeller rotors, a turbine together with a hydraulic reaction member, first means connecting the first stage impeller rotor to the power input member and second means connecting the second stage impeller rotor to the rotating regenerative reaction sun gear member to enable each of said impeller rotors to transmit torque to the motive fluid, means connecting the turbine to the gear set driving member to receive the combined torque from the motive fluid, the hydraulic reaction member being arranged to assist said turbine to amplify the torque there received.

4. A torque multiplying device including a power input member, a planetary gear set of infinitely variable speed ratioing action and hydrodynamic means in coupled arrangement therewith, the planetary gear set including a driving member, a rotating regenerative reaction sun gear member and an output member arranged to be actuated by differential ratio action of the other two said gear set members, said planetary gear means including drive means between the driving member and the reaction sun gear member including means to transfer rotative movement from the driving member to the reaction sun gear member in the same relative direction whenever said output member is rotating at a different rotative speed than said driving member, the hydrodynamic means containing a motive fluid and including first stage and second stage impeller rotors, a turbine together with a hydraulic reaction member and a one-way brake, first means connecting the first stage impeller rotor to the power input member and second means connecting the second stage impeller rotor to the rotating regenerative reaction sun gear member to enable each of said impeller rotors to transmit torque to the motive fluid, means connecting the turbine to the gear set driving member to receive the combined torque from the motive fluid, the hydraulic reaction member being arranged responsive to the one-way brake to assist said turbine to amplify the torque there received and for free wheeling action in the direction of turbine rotation.

7

5. A torque multiplying device including a power input member, a planetary gear set of infinitely variable speed ratioing action and hydrodynamic means in coupled arrangement therewith, the planetary gear set including a ring gear as the driving member, a rotating regenerative reaction sun gear member and an output planet pinion carrier member rotatably supporting planet pinions arranged intermeshed in pairs of which one is meshed to the ring gear and the other one meshed to the sun gear, the hydrodynamic means containing a motive fluid and including first stage and second stage impeller rotors, a turbine together with a hydraulic reaction member, first means connecting the first stage impeller rotor to the power input member and second means connecting the second stage impeller rotor to the rotating regenerative reaction sun gear member to enable each of said impeller rotors to transmit torque to the motive fluid, means connecting the turbine to the ring gear driving member to receive the combined torque from the motive fluid, the hydraulic reaction member being arranged to assist said turbine to amplify the torque there received.

6. A torque multiplying device including a power input member, a planetary gear set of infinitely variable speed ratioing action and hydrodynamic means in coupled arrangement therewith, the planetary gear set including a ring gear as the driving member, a rotating regenerative reaction sun gear member and an output planet pinion carrier member rotatably supporting planet pinions arranged intermeshed in pairs of which one is meshed to the ring gear and the other one meshed to the sun gear, the hydrodynamic means containing a motive fluid and including first stage and second stage impeller rotors, a turbine together with a hydraulic reaction member and a one-way brake, first means connecting the first stage impeller rotor to the power input member and second means connecting the second stage impeller rotor to the rotating regenerative reaction sun gear member to enable each of said impeller rotors to transmit torque to the motive fluid, means connecting the turbine to the ring gear driving member to receive the combined torque from the motive fluid, the hydraulic reaction member being arranged responsive to the one-way brake to assist said turbine to amplify the torque there received and for free wheeling action in the direction of turbine rotation.

7. A torque multiplying device including a power input member, a planetary gear set and hydrodynamic means in coacting arrangement therewith, the planetary gear set including a driving member in differential ratio action arrangement with a rotating regenerative gearing reaction member and an output member, said planetary gear means including drive means between the driving member and the reaction member including means to transfer rotative movement from the driving member to the reaction member in the same relative direction whenever said output member is rotating at a different rotative speed than said driving member, the hydrodynamic means containing a motive fluid and including first stage and second stage impeller rotors, a turbine together with a hydraulic reaction member, first means connecting first stage impeller rotor to the power input member and second means connecting the second stage impeller rotor to the rotating regenerative gearing reaction member to enable each of said impeller rotors to transmit torque to the motive fluid, means connecting the turbine to the gear set driving member to receive the combined torque from the motive fluid, the hydraulic reaction member being arranged to assist said turbine to amplify the torque there received, said second stage impeller rotor being arranged, ratio action responsive to varying turbine torque amplification and correspondingly operative to overrun the first stage impeller rotor.

8. A torque multiplying device including a power input member, a planetary gear set and hydrodynamic means in coacting arrangement therewith, the planetary gear set including a driving member in differential ratio action arrangement with a rotating regenerative gearing reaction member and an output member, said planetary gear means including drive means between the driving member and the reaction member including means to transfer rotative movement from the driving member to the reaction member in the same relative direction whenever said output member is rotating at a different rotative speed than said driving member, the hydrodynamic means containing a motive fluid and including first stage and second stage impeller rotors, a turbine together with a hydraulic reaction member and a one-way brake, first means connecting the first stage impeller rotor to the power input member and second means connecting the second stage impeller rotor to the rotating regenerative gearing reaction member to enable each of said impeller rotors to transmit torque to the motive fluid, means connecting the turbine to the gear set driving member to receive the combined torque from the motive fluid, the hydraulic reaction member being arranged responsive to the one-way brake to assist said turbine to amplify the torque there received and for free wheeling action in the direction of turbine rotation, said second stage impeller rotor being arranged ratio action responsive to varying turbine torque amplification and correspondingly operative to overrun the first stage impeller rotor.

9. A torque multiplying device including a power input member, a planetary gear set and hydrodynamic means in coacting arrangement therewith, the planetary gear set including a driving member in differential ratio action arrangement with a rotating regenerative reaction sun gear member and an output member, said planetary gear means including drive means between the driving member and the reaction sun gear member including means to transfer rotative movement from the driving member to the reaction sun gear member in the same relative direction whenever said output member is rotating at a different rotative speed than said driving member, the hydrodynamic means containing a motive fluid and including first stage and second stage impeller rotors, a turbine together with a hydraulic reaction member, first means connecting the first stage impeller rotor to the power input member and second means connecting the second stage impeller rotor to the rotating regenerative reaction sun gear member to enable each of said impeller rotors to transmit torque to the motive fluid, means connecting the turbine to the gear set driving member to receive the combined torque from the motive fluid, the hydraulic reaction member being arranged to assist said turbine to amplify the torque there received, said second stage impeller rotor being arranged ratio action responsive to varying turbine torque amplification and correspondingly operative to overrun the first stage impeller rotor.

10. A torque multiplying device including a power input member, a planetary gear set and hydrodynamic means in coacting arrangement therewith, the planetary gear set including a driving member in differential ratio action arrangement with a rotating regenerative reaction sun gear member and an output member, said planetary gear means including drive means between the driving member and the reaction sun gear member including means to transfer rotative movement from the driving member to the reaction sun gear member in the same relative direction whenever said output member is rotating at a different rotative speed than said driving member, the hydrodynamic means containing a motive fluid and including first stage and second stage impeller rotors, a turbine together with a hydraulic reaction member and a one-way brake, first means connecting the first stage impeller rotor to the power input member and second means connecting the second stage impeller rotor to the rotating regenerative reaction sun gear member to enable each of said impeller rotors to transmit torque to the motive fluid, means connecting the turbine to the gear set driving member to receive the combined torque from the motive fluid, the hydraulic reaction member being arranged responsive to the one-way brake to assist said turbine to amplify the torque there received and for free wheeling action in the direction of turbine rotation, said second stage impeller rotor being arranged ratio action responsive to varying turbine torque amplification and correspondingly operative to overrun the first stage impeller rotor.

11. A torque multiplying device including a power input member, a planetary gear set and hydrodynamic means in coupled arrangement therewith, the planetary gear set including a ring gear driving member in differential ratio action arrangement with a rotating regenerative reaction sun gear member and an output planet pinion carrier member rotatably supporting planet pinions arranged intermeshed in pairs of which one is meshed to the ring gear and the other one meshed to the sun gear, the hydrodynamic means containing a motive fluid and including first stage and second stage impeller rotors, a turbine together with a hydraulic reaction member, first means connecting the first stage impeller rotor to the power input member and second means connecting the second stage impeller rotor to the rotating regenerative reaction sun gear member to enable each of said impeller rotors to transmit torque to the motive fluid, means connecting the turbine to the ring gear driving member to receive the combined torque from the motive fluid, the hydraulic reaction member being arranged to assist said turbine to amplify the torque there received, said second stage impeller rotor being arranged ratio action responsive to varying turbine torque amplification and correspondingly operative to overrun the first stage impeller rotor.

12. A torque multiplying device including a power input member, a planetary gear set and hydrodynamic means in coacting arrangement therewith, the planetary gear set including a driving member in differential ratio action arrangement with a rotating regenerative gearing reaction member and an output member, said planetary gear means including drive means between the driving member and the reaction member including means to transfer rotative movement from the driving member to the reaction member in the same relative direction whenever said output member is rotating at a different rotative speed than said driving member, the hydrodynamic means containing a motive fluid and including first stage and second stage vaned impeller rotors, a turbine together with a hydraulic reaction member, first means connecting the first stage impeller rotor to the power input member and second means connecting the second stage impeller rotor to the rotating regenerative gearing reaction member to enable each of said impeller rotors to transmit torque to the motive fluid, means connecting the turbine to the gear set driving member to receive the combined torque from the motive fluid, the hydraulic reaction member being arranged to assist said turbine to amplify the torque there received, the vanes of said second stage impeller rotor substantially extending radially outward beyond the vanes of the first stage impeller rotor in a further action arrangement of increasing the centrifugal component of force exerted on the motive fluid by said second stage over that of said first stage.

13. A torque multiplying device including a power input member, a planetary gear set and hydrodynamic means in a coacting arrangement therewith, the planetary gear set including a driving member in differential ratio action arrangement with a rotating regenerative gearing reaction member and the output member, said planetary gear means including drive means between the driving member and the reaction member including means to transfer rotative movement from the driving member to the reaction member in the same relative direction whenever said output member is rotating at a different rotative speed than said driving member, the hydrodynamic means containing a motive fluid and including first stage and second stage vaned impeller rotors, a turbine together with a hydraulic reaction member and a one-way brake, first means connecting the first stage impeller rotor to the power input member and second means connecting the second stage impeller rotor to the rotating regenerative gearing reaction member to enable each of said impeller rotors to transmit torque to the motive fluid, means connecting the turbine to the gear set driving member to receive the combined torque from the motive fluid, the hydraulic reaction member being arranged responsive to the one-way brake to assist said turbine to amplify the torque there received and for free wheeling action in the direction of turbine rotation, the vanes of said second stage impeller rotor substantially extending radially outward beyond the vanes of the first stage impeller rotor in a further action arrangement of increasing the centrifugal component of force exerted on the motive fluid by said second stage over that of said first stage.

14. A torque multiplying device, including a power input member, a planetary gear set and hydrodynamic means in a coacting arrangement therewith, the planetary gear set including a driving member in differential ratio action arrangement with a rotating regenerative reaction sun gear member and an output member, said planetary gear means including drive means between the driving member and the reaction sun gear member including means to transfer rotative movement from the driving member to the reaction sun gear member in the same relative direction whenever said output member is rotating at a different rotative speed than said driving member, the hydrodynamic means containing a motive fluid and including first stage and second stage vaned impeller rotors, a turbine together with a hydraulic reaction member, first means connecting the first stage impeller rotor to the power input member and second means connecting the second stage impeller rotor to the rotating regenerative reaction sun gear member to enable each of said impeller rotors to transmit torque to the motive fluid, means connecting the turbine to the gear set driving member to receive said combined torque from the motive fluid, the hydraulic reaction member being arranged to assist said turbine to amplify the torque there received, the vanes of said second stage impeller rotor substantially extending radially outward beyond the vanes of the first stage impeller rotor in a further action arrangement of increasing the centrifugal component of force exerted on the motive fluid by said second stage over that of said first stage.

15. A torque multipling device including a power input member, a planetary gear set and hydrodynamic means in a coacting arrangement therewith, the planetary gear set including a driving member in differential ratio action arrangement with a rotating regenerative reaction sun gear member and an output member, said planetary gear means including drive means between the driving member and the reaction sun gear member including means to transfer rotative movement from the driving member to the reaction sun gear member in the same relative direction whenever said output member is rotating at a different rotative speed than said driving member, the hydrodynamic means containing a motive fluid and including first stage and second stage vaned impeller rotors, a turbine together with a hydraulic reaction member and a one-way brake, first means connecting the first stage impeller rotor to the power input member and second means connecting the second stage impeller rotor to the rotating regenerative reaction sun gear member to enable each of said impeller rotors to transmit torque to the motive fluid, means connecting the turbine to the gear set driving member to receive the combined torque from the motive fluid, the hydraulic reaction member being arranged responsive to the one-way brake to assist said turbine to amplify the torque there received and for free wheeling action in the direction of turbine rotation, the vanes of said second stage impeller rotor substantially extending radially outward beyond the vanes of the first stage impeller rotor in a further action arrangement of increasing the centrifugal component of force exerted on the motive fluid by said second stage over that of said first stage.

16. In a torque multiplying device including a power input member, a planetary gear set and hydrodynamic means in a coacting arrangement therewith, the planetary gear set including a driving member in differential ratio action arrangement with a rotating regenerative gearing reaction member and an output member, said planetary gear means including drive means between the driving member and the reaction member including means to transfer rotative movement from the driving member to the reaction member in the same relative direction whenever said output member is rotating at a different rotative speed than said driving member, the hydrodynamic means containing a motive fluid and including first stage and second stage vaned impeller rotors, a turbine together with a hydraulic reaction member, first means connecting the first stage impeller rotor to the power input member and second means connecting the second stage impeller rotor to the rotating regenerative gearing reaction member to enable each of said impeller rotors to transmit torque to the motive fluid, means connecting the turbine to the gear set driving member to receive the combined torque from the motive fluid, the hydraulic reaction member being arranged to assist said turbine to amplify the torque there received, said differential ratio action arrangement including means to impart turbine torque of a major proportion to said output member and of a minor proportion to said gearing reaction member, said second stage impeller rotor vanes formed to extend partially at least inclining backwards to the direction of their motion.

17. In a torque multiplying device including a power input member, a planetary gear set and hydrodynamic means in a coacting arrangement therewith, the planetary gear set including a driving member in differential ratio action arrangement with a rotating regenerative reaction sun gear member and an output member, said planetary gear means including drive means between the driving member and the reaction sun gear member including means to transfer rotative movement from the driving member to the reaction sun gear member in the same relative direction whenever said output member is rotating at a different rotative speed than said driving member, the hydrodynamic means containing a motive fluid and including first stage and second stage vaned impeller rotors, a turbine together with a hydraulic reaction member and a one-way brake, first means connecting the first stage impeller rotor to the power input member and second means connecting the second stage impeller rotor to the rotating regenerative reaction sun gear member to enable each of said impeller rotors to transmit torque to the motive fluid, means connecting the turbine to the gear set driving member and arranged to receive the combined torque from the motive fluid, the hydraulic reaction member being arranged responsive to the one-way brake to assist said turbine to amplify the torque there received and for free wheeling action in the direction of turbine rotation, said differential ratio action arrangement including means to impart turbine torque of a major proportion to said output member and of a minor proportion to said reaction sun gear member, said second stage impeller rotor vanes formed to extend partially at least inclining backwards to the direction of their motion.

18. In a torque multiplying device including a power input member, a planetary gear set and hydrodynamic means in a coacting arrangement therwith, the planetary gear set including a driving member in differential ratio action arrangement with a rotating regenerative gearing reaction member and an output member, said planetary gear means including drive means between the driving member and the reaction member including means to transfer rotative movement from the driving member to the reaction member in the same relative direction whenever said output member is rotating at a different rotative speed than said driving member, the hydrodynamic means containing a motive fluid and including first stage and second stage vaned impeller rotors, a turbine together with a hydraulic reaction member, first means connecting the first stage impeller rotor to the power input member and second means connecting the second stage impeller rotor to the rotating regenerative gearing reaction member to enable each of said impeller rotors to transmit torque to the motive fluid, means connecting the turbine to the gear set driving member to receive the combined torque from the motive fluid, the hydraulic reaction member being arranged to assist said turbine to amplify the torque there received, said differential ratio action arrangement including means to impart turbine torque of a major proportion to said output member and of a minor proportion to said gearing reaction member, said second stage impeller vanes formed to extend partially at least inclining backwards to the direction of their motion at a greater angle than that of said first stage impeller vanes.

19. In a torque multiplying device including a power input member, a planetary gear seat and hydrodynamic means in a coacting arrangement therewith, the planetary gear set including a driving member in differential ratio action arrangement with a rotating regenerative reaction sun gear member and an output member, said planetary gear means including drive means between the driving member and the reaction sun gear member including means to transfer rotative movement from the driving member to the reaction sun gear member in the same relative direction whenever said output member is rotating at a different rotative speed than said driving member, the hydrodynamic means containing a motive fluid and including first stage and second stage vaned impeller rotors, a turbine together with a hydraulic reaction member and a one-way brake, first means connecting the first stage impeller rotor to the power input member and second means connecting the second stage impeller rotor to the rotating regenerative reaction sun gear member to enable each of said impeller rotors to transmit torque to the motive fluid, means connecting the turbine to the gear set driving member and arranged to receive the combined torque from the motive fluid, the hydraulic reaction member being arranged responsive to the one-way brake to assist said turbine to amplify the torque there received and for free wheeling action in the direction of turbine rotation, said differential ratio action arrangement including means to impart turbine torque of a major proportion to said output member and of a minor proporation to said reaction sun gear member, said second stage impeller vanes formed to extend partially at least inclining backwards to the direction of their motion at a greater angle than that of said first stage impeller vanes.

References Cited

UNITED STATES PATENTS

| | | | |
|---|---|---|---|
| 2,290,319 | 7/1942 | Dodge | 74—688 |
| 2,334,394 | 11/1943 | Dodge | 74—688 |
| 2,373,894 | 4/1945 | Jandasek | 74—677 |
| 2,378,085 | 6/1945 | Jandasek | 74—688 |
| 3,150,542 | 9/1964 | Baker | 74—677 X |
| 3,188,887 | 6/1965 | Gabriel | 74—677 |
| 3,189,144 | 6/1965 | Gabriel | 74—677 X |
| 3,250,150 | 5/1966 | Stockton | 74—688 |

HENRY F. RADUAZO, *Primary Examiner.*

DAVID J. WILLIAMOWSKY, DONLEY J. STOCKING, *Examiners.*

J. R. BENEFIEL, *Assistant Examiner.*